United States Patent
Twisselmann

(12) 
(10) Patent No.: US 6,215,589 B1
(45) Date of Patent: Apr. 10, 2001

(54) MIRROR SYSTEM FOR STEREOSCOPIC IMAGE ERECTION

(75) Inventor: Lorenz Twisselmann, Prisdorf (DE)

(73) Assignee: Moller-Wedel GmbH, Wedel (DE)

( * ) Notice: Subject to any disclaimer, the term of this patent is extended or adjusted under 35 U.S.C. 154(b) by 0 days.

(21) Appl. No.: 09/553,660

(22) Filed: Apr. 21, 2000

(30) Foreign Application Priority Data

Apr. 22, 1999 (DE) .............................................. 199 18 405

(51) Int. Cl.⁷ .................................................. G02B 21/22
(52) U.S. Cl. ........................................... 359/376; 359/368
(58) Field of Search .................................... 359/368, 372, 359/376, 377, 378, 373, 431, 834

(56) References Cited

U.S. PATENT DOCUMENTS 5,009,487 * 4/1991 Reiner .................................... 359/376
5,986,801 * 11/1999 Volk et al. ............................. 359/376

* cited by examiner

Primary Examiner—Cassandra Spyrou
Assistant Examiner—Mark A. Robinson

(74) Attorney, Agent, or Firm—Alix, Yale & Ristas, LLP

(57) ABSTRACT

An optical system for a stereoscopic surgical microscope for interchanging two light rays parallel to the optical centre axis with simultaneous image reversion for both rays without parallel offset of the emerging pair of rays with respect to the entering pair of rays, comprising elements reflecting on one side and two elements reflecting in parallel on both sides, all of which are arranged in a plane perpendicular to the optical axis. Each of the elements reflecting on both sides reflects the incident ray with its front side via the elements reflecting on one side to the rear side of the respectively other elements reflecting on both sides. All the optical elements are configured as flat, superficially mirror-coated mirrors, so that their substrate lies completely outside the path of rays. The mirrors mirror-coated on both sides are shaped such that, in the plan view along the optical axis, their edge in the vicinity of the optically neighbouring mirrors mirror-coated on one side extends tangentially virtually parallel to the reflecting surface of the latter, so that they can be brought up to one another until they touch. The reflection surfaces of the two mirrors mirror-coated on both sides form with the plane of the optical arrangement an angle of greater than 45°, in order to avoid a disturbing parallel offset of the emerging pair of rays with respect to the entering pair of rays.

20 Claims, 3 Drawing Sheets

MIRROR SYSTEM FOR STEREOSCOPIC IMAGE ERECTION

BACKGROUND OF THE INVENTION

The invention relates to an optical system for a stereoscopic surgical microscope for interchanging two parallel light rays with simultaneous image reversion for both rays without parallel offset of the emerging pair of rays with respect to the entering pair of rays, comprising elements reflecting on one side and two elements reflecting in parallel on both sides, all arranged in a plane perpendicular to the incident rays, each of the elements reflecting on both sides reflecting with its front side the incident ray via the elements reflecting on one side to the rear side of the respectively other elements reflecting on both sides.

Prism systems for stereoscopic image erection of this type are known (DE-C 38 26 069). From the viewpoint of application technology, it is desirable to accommodate the optical arrangement in the microscope in a way which saves as much space as possible. To avoid undesired light losses, it is endeavoured to obtain shortest possible optical path lengths within the device. Since surgical microscopes are generally mounted movably to allow them to be oriented freely, but nevertheless have to be fastened stably, the weight of the microscope must be kept down as much as possible.

SUMMARY OF THE INVENTION

The invention is based on the object of providing an optical system for stereoscopic image erection of the type stated at the beginning which makes possible an arrangement which is as space-saving and lightweight as possible for accommodating in a microscope and which keeps the optical path as short as possible.

Accordingly, all the optical elements are configured as flat, lightweight mirrors, comprising a flat, lightweight substrate with a metallic mirror coating of the surface on one or both sides, so that their substrate lies completely outside the optical path. Although the replacement of reflecting prisms by mirrors is known in principle in optics and is also mentioned in passing in the prior art (DE 38 26 069 C2, column 7, lines 52–55), it is not evident how a reduction in the dimensions could be achieved by such a replacement.

On the other hand, the invention teaches a specific shaping of the elements mirror-coated on both sides which, together with the flat form of the mirrors mirror-coated on one side, makes possible a particularly compact arrangement of the optical system. The said shaping is in relation to a plan view along the optical axis (hereafter referred to as "plan view" for short). The optical axis of the mirror system refers in principle to the parallel longitudinal axis of the microscope central to the incident light rays. The incident light is formed by two extended bundles of light rays, which in the plane of the optical arrangement have a diameter of OD; referred to as light rays are the mid rays of the bundles of light.

In the plan view of the mirror system, the edge of the mirrors mirror-coated on both sides is, according to the invention, shaped in the vicinity of the optically neighbouring mirrors mirror-coated on one side such that it is tangentially virtually parallel to the reflecting surface of the latter. The mirrors mirror-coated on both sides are expediently cut such that they are oval, so that their edge is circular in plan view, with a diameter at least equal to OD; the tangent to the edge of the circle at the point of least distance from the optically neighbouring mirror mirror-coated on one side is then in any event parallel to the reflecting surface of the latter. The inventive shaping of the mirrors mirror-coated on both sides allows the mirrors mirror-coated on one side to be brought very close up to the mirrors mirror-coated on both sides, in principle until they touch.

On the other hand, the specific form of reflecting prisms, governed by the position of the substrate in the path of rays, excludes a shaping of the elements reflecting on both sides in the way according to the invention.

The replacement of reflecting prisms by flat mirrors in the present case is accompanied by considerable difficulties, due to the finite thickness SD of the mirror substrate of the elements mirror-coated on both sides. In the arrangement described by the prior art, this leads to a parallel offset of the emerging pair of rays with respect to the entering pair of rays of 1.41 SD; this offset is undesired, since it must be possible in practice to remove the optical system from the path of rays without the rays being offset.

The invention teaches that a correction of the disturbing parallel offset described can be achieved by an altered inclination, in comparison with the prior art, just of the mirrors mirror-coated on both sides, while retaining the orientation of the mirrors mirror-coated on one side. The difficulty here lies in the fact that, by altering the inclination of one of the mirrors mirror-coated on both sides, both emerging rays are always influenced at the same time; in this case, the emerging rays are not only offset with respect to the entering rays in the way intended but are also inclined in a disturbing way. It is therefore surprising that, by altering only two variables, namely the setting angle $\lambda$, $\lambda'$ of the mirrors mirror-coated on both sides with respect to the plane of the optical axis, four independent variables, namely the inclination and offset of the two emerging partial rays, can be corrected; a person skilled in the art assumes that this is possible only by altering two additional independent variables, for instance by altering the orientation of the mirrors mirror-coated on one side. However, it has surprisingly been found that this is not the case. By suitable choice of a setting angle $\lambda=\lambda'$, which must be greater than the angle disclosed by the prior art of $\lambda=45°$, the parallel offset of the emerging pair of rays with respect to the entering pair of rays can finally be corrected. The specific choice of the angle $\lambda>45°$ depends inter alia on the substrate thickness SD of the mirrors mirror-coated on both sides.

The shaping according to the invention of the mirrors mirror-coated on both sides allows the reflection surfaces of the elements reflecting on one side to be brought up to the mid rays of the incident bundles of light to within the absolute minimum distance of 0.5 OD; OD here describes the diameter of the incident bundles of light in the plane of the optical arrangement. The prism system configured in the prior art, on the other hand, must have a distance of the reflecting surfaces of the elements reflecting on one side from the centre axes of the entering bundles of rays that is increased by least 40% in comparison with the inventive mirror system, of 0.705 OD. With the inventive mirror system, a maximum radial extent of the entire construction of R=1.205 OD+0.705 SD is achieved. Since in practice the mirror thickness SD can be kept small in comparison with the diameter OD of the bundles of light, the inventive arrangement comes close to a maximum radius of R=1.205 OD. This means a reduction in comparison with the prior art of almost 20% (DE-38 26 069 A1, FIG. 3; R=1.5 OD). In a corresponding way, the optical path of 2.82 OD of a ray of light in the plane of the optical arrangement can be reduced by 40% in comparison with the prior art (4 OD). On the other hand, the overall height is increased only minimally by the slight additional inclination of the mirrors mirror-coated on both sides, which is likewise accompanied only by a minimum increase in the optical path.

Configuring all the optical elements as mirrors and arranging them in such a way that their substrate lies completely outside the path of rays also has the advantage that the mirror substrate does not have to meet any requirements regarding its optical quality. Moreover, imaging errors inextricably linked with the passage of the light rays through the surface of the prisms are avoided.

It regularly happens in practice that a surgical microscope is to be used without interchanging of the two light rays and without image reversion. For this purpose, the mirror system to which the present invention relates is to allow itself be removed from the path of rays of the microscope, if possible without the radial extent of the microscope being increased as a result. Therefore, at least the mirrors mirror-coated on both sides are advantageously pivotable about the optical axis and allow themselves to be removed completely from the path of rays by turning them jointly through 90° with respect to the operational arrangement, so that the bundles of light pass freely through the mirror system.

It is to be explained below which conditions make the free passage of light mentioned possible. For this purpose, the mirror system is again viewed in plan view along the optical axis. Now let us imagine a square, the diagonal of which is perpendicular to the plane defined by the two incident light rays, which is intersected at the centre by the optical axis and the edge length of which is as small as possible, but still completely surrounds both mirrors mirror-coated on both sides. The two mirrors mirror-coated on both sides are then expediently each arranged exclusively in opposite quadrants of the said square; the two other opposite quadrants are expediently completely transparent on an area corresponding to the bundles of light. In a base plate bearing the optical elements, circular bores with a diameter OD may be provided, for example, for this purpose. After turning through 90° about the optical axis, the two mirrors mirror-coated on both sides then lie in the other quadrants, respectively, and consequently outside the bundles of light, which can pass freely through the circular bores in the base plate. The mirrors mirror-coated on one side, on the other hand, are to be arranged inside the said square for the purpose of free passage of light.

BRIEF DESCRIPTION OF THE DRAWINGS

The features described so far and further features are presented below with reference to an advantageous exemplary embodiment which is illustrated in FIGS. 1 to 3, in which.

DETAILED DESCRIPTION OF THE PREFERRED EMBODIMENT

Figure 1:
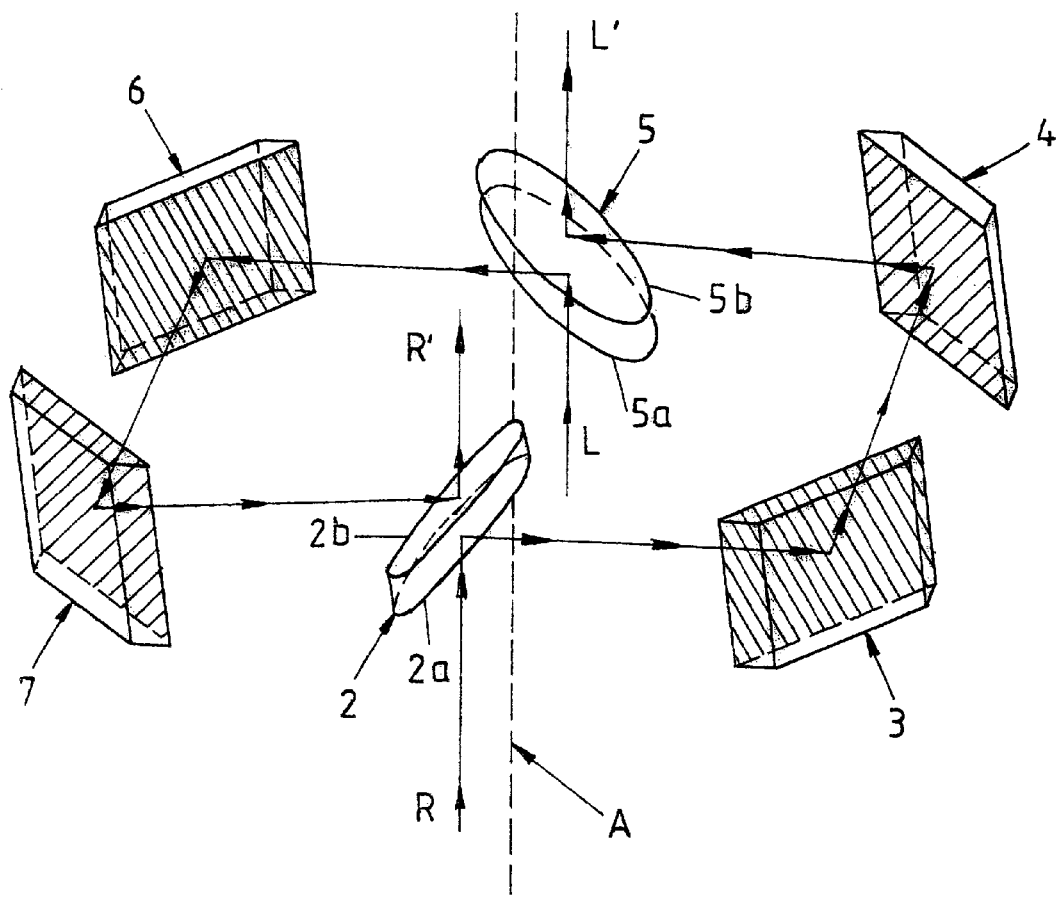
FIG. 1 shows a perspective representation of the inventive mirror system.

Fastened on a base plate 1, which is oriented perpendicularly with respect to the incident parallel rays R, L, are six optical elements 2–7. The two oval mirrors 2 and 5 are mirror-coated on both sides, the four rectangular mirrors 3, 4, 6 and 7 are mirror-coated on one side.

In the operational state, the ray R parallel to the optical axis A impinges on the reflecting front side 2a of the mirror 2 mirror-coated on both sides, the said front side being inclined with respect to the plane E of the optical arrangement by a specific angle $\lambda > 45°$. The light ray R is deflected by the mirror surface 2a through the angle $2\lambda > 90°$ and impinges on the mirror 3 mirror-coated on one side, the surface perpendicular of which lies in a plane parallel to the plane (E) of the optical arrangement and forms an angle of 45° with the perpendicular to the plane defined by the two incident light rays. The light ray is therefore reflected through 90° by the mirror 3 mirror-coated on one side and impinges on a similarly oriented mirror 4 mirror-coated on one side, which reflects the partial ray through 90° onto the rear side 5b of the mirror 5 mirror-coated on both sides. The mirror 5, which is inclined with respect to the plane of the optical arrangement by the same angle $\lambda > 45°$ as the mirror 2, finally deflects the partial ray through the angle $2\lambda$, so that the partial ray L' emerges parallel to the incident partial ray R.

In an analogous way, the partial ray L is deflected via the front side 5a of the mirror 5 mirror-coated on both sides and via the mirrors 6 and 7 mirror-coated on one side onto the rear side 2b of the mirror 2 mirror-coated on both sides and is reflected from there in such a way that it lies on a line with the incident partial ray R. The front reflection surfaces 2a, 5a of the two mirrors 2, 5 mirror-coated on both sides intersect one another in a line which lies in the plane defined by the incident light rays R, L.

Figure 2:
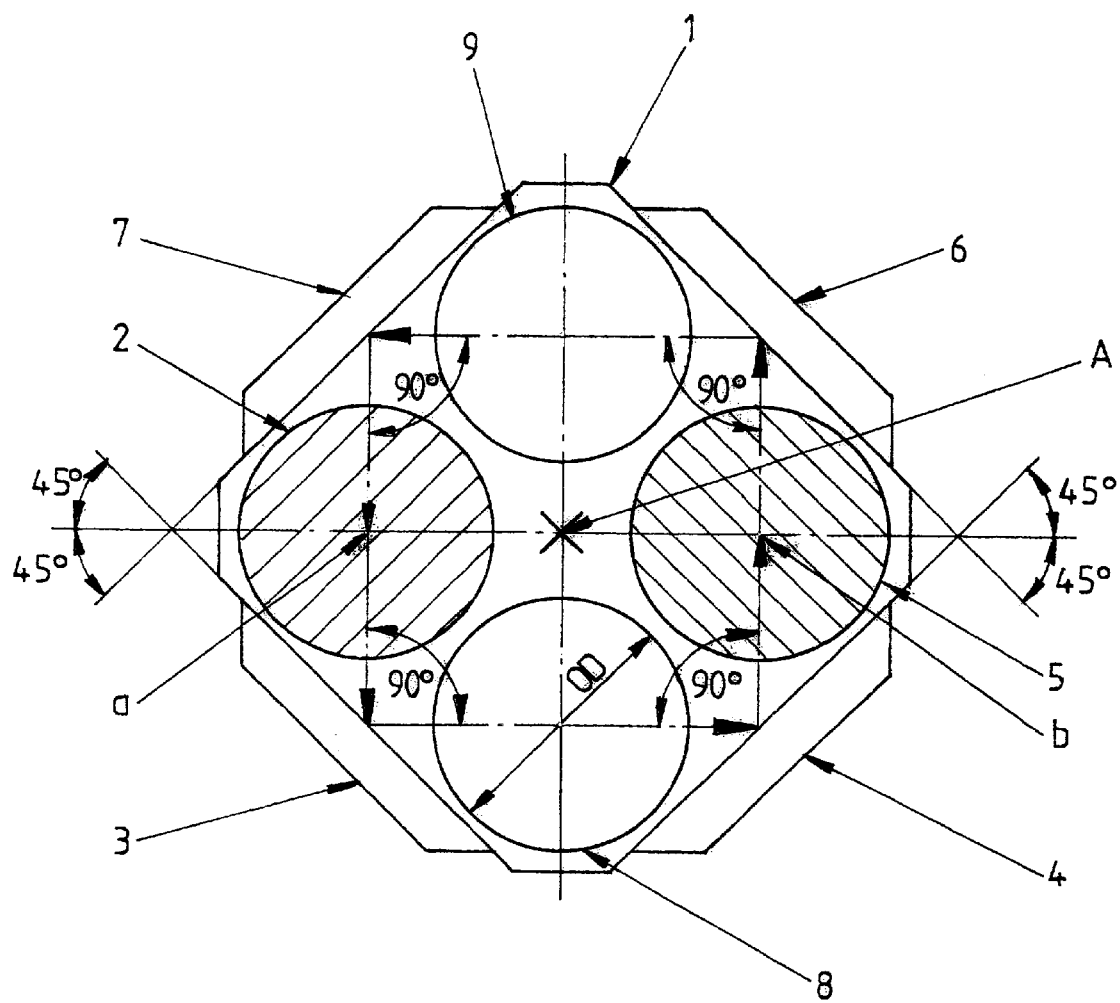
FIG. 2 shows a plan view along the optical axis A of the inventive mirror system.

The mirrors 2 and 5 mirror-coated on both sides are cut such that they are oval, so that they appear circular with the diameter OD in the plan view of the mirror system along the optical axis A (see FIG. 2). In the projection of the mirrors 2 and 5 mirror-coated on both sides, two bores for the passage of rays are provided in the base plate 1. Two further circular bores 8, 9 of the same size have been made in the base plate 1. The four circles formed by the mirrors 2, 5 mirror-coated on both sides, with their bores, and by the bores 8, 9 are arranged very compactly in the form of a cross. The mirrors 3, 4, 6 and 7 mirror-coated on one side can be brought up to the mirrors 2, 5 mirror-coated on both sides until they touch, in the way shown in FIG. 2. At the points of contact, the tangents to the circular shapes mentioned above extend parallel to the reflection surfaces of the mirrors 3, 4, 6, 7 reflecting on one side.

The mirrors 2, 5 mirror-coated on both sides and the circular bores 8, 9 in the base plate are respectively arranged in opposite quadrants of a square, the sides of which are formed by the reflection surfaces of the mirrors 3, 4, 6, 7 mirror-coated on one side. On the other hand, the mirrors mirror-coated on one side lie outside this square. When the mirror system is turned about the optical axis A through 90°, therefore, the mirrors 2, 5 mirror-coated on both sides are removed completely from the path of rays and the light bundles pass completely freely through the bores 8, 9 in the base plate.

Figure 3:
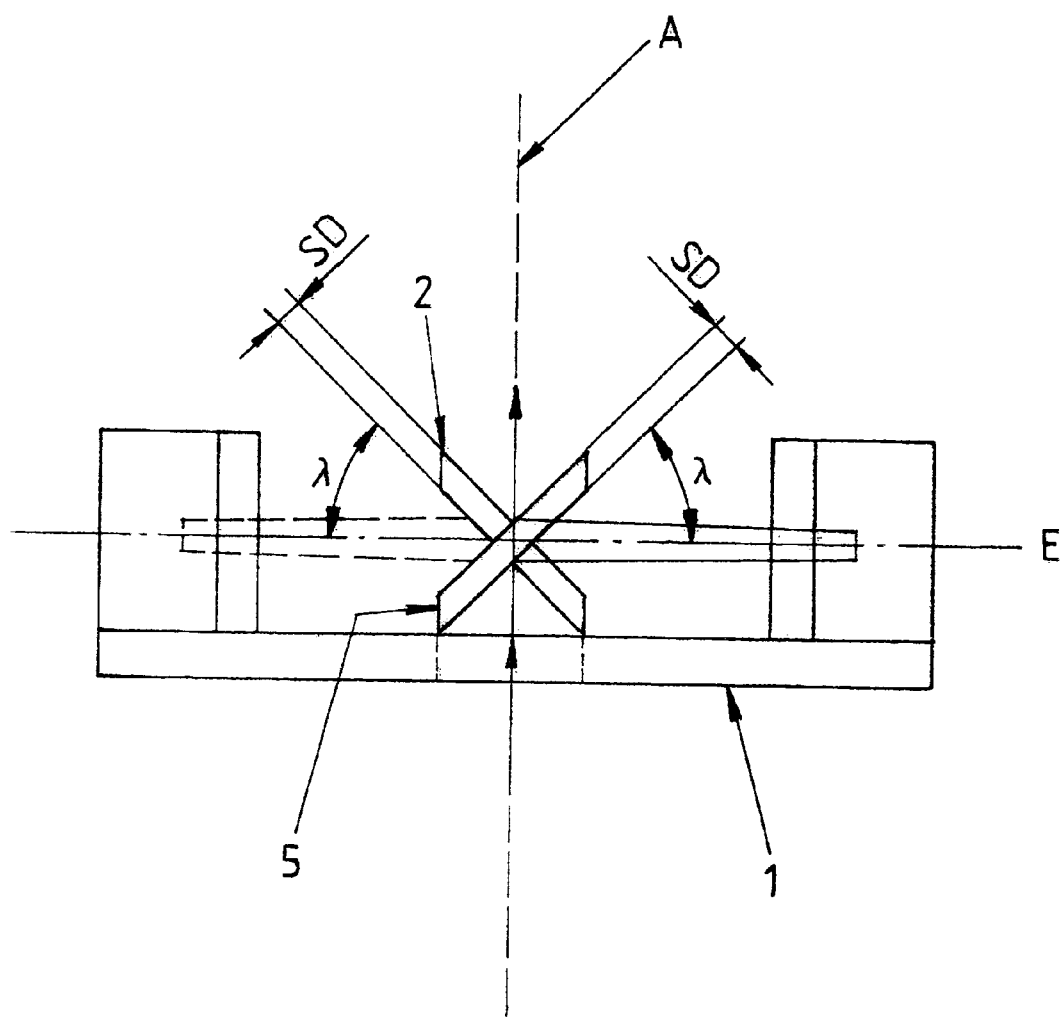
FIG. 3 shows a side view of the inventive mirror system long the plane which is defined by the two incident light rays.

FIG. 3 illustrates that emergence of the pair of rays without parallel offset with respect to the incident pair of rays can be achieved by an inclination of the mirrors 2, 5 mirror-coated on both sides, their reflection surfaces forming an angle of $\lambda > 45°$ with the plane of the optical arrangement. The angle $\lambda$ is fixed by the requirement for the passage of light without parallel offset and depends, inter alia, on the mirror thickness SD of the elements 2 and 5 mirror-coated on both sides.

What is claimed is:

1. Optical system for a stereoscopic surgical microscope for interchanging two light rays (R, L) parallel to an optical centre axis (A) with simultaneous image reversion for both rays without parallel offset of emerging pair of rays (L', R') with respect to the entering pair of rays (R, L), comprising optical elements reflecting on one side and two optical elements reflecting in parallel on both sides, all arranged in a plane (E) perpendicular to the optical axis (A), each of the elements reflecting on both sides reflecting with its front side the incident ray (R and L) via the elements reflecting on one side to the rear side of the other element reflecting on both sides, characterized a) in that all the optical elements are configured as flat, superficially mirror-coated mirrors, so that their substrate lies completely outside the path of rays, b) in that the mirrors mirror-coated on both sides are shaped such that, in the plan view along the optical axis (A), an edge of each in the vicinity of the optically neighbouring mirrors mirror-coated on one side extends tangentially virtually parallel to the reflecting surface of the respective optically neighboring mirror, and c) in that the reflection surfaces of the two mirrors mirror-coated on both sides form with the plane (E) of the optical arrangement an angle $\lambda$ of greater than 45°.

2. Optical system according to claim 1, characterized in that at least the elements reflecting on both sides are pivotable about the optical centre axis (A), and in that, when turned through 90° about the optical axis, the bundles of light pass completely freely through the optical arrangement.

3. Optical system characterized in that in a base plate bearing the optical elements there are two bores, through which the light bundles pass completely freely after turning of the optical system according to claim 2.

4. Optical system according to claim 3, characterized in that the bores in the base plate are circular with a diameter at least equal to the light bundles in the plane (E) of the optical arrangement.

5. Optical system according to claim 1, characterized in that points of intersection of the incident rays with the front reflection surfaces of the mirrors mirror-coated on both sides lie in a plane parallel to the plane containing the incident rays (R,L).

6. Optical system according to claim 1, characterized in that the mirrors mirror-coated on both sides are cut such that they are oval, so that their edge appears circular in the plan view along the optical axis (A).

7. Optical system according to claim 1, characterized in that the perpendiculars to the reflection surfaces of the mirrors mirror-coated on one side respectively lie in a plane parallel to the plane (E) of the optical arrangement.

8. Optical system according to claim 1, characterized in that it has precisely four mirrors reflecting on one side.

9. Optical system according to claim 8, characterized in that the reflection surfaces of the mirrors mirror-coated on one side each form an angle of 45° with the plane defined by the incident light rays (R, L).

10. Optical system according to claim 2, characterized in that points of intersection of the incident rays with the front reflection surfaces of the mirrors mirror-coated on both sides lie in a plane parallel to the plane containing the incident rays (R,L).

11. Optical system according to claim 3, characterized in that points of intersection of the incident rays with the front reflection surfaces of the mirrors mirror-coated on both sides lie in a plane parallel to the plane containing the incident rays (R,L).

12. Optical system according to claim 4, characterized in that points of intersection of the incident rays with the front reflection surfaces of the mirrors mirror-coated on both sides lie in a plane parallel to the plane containing the incident rays (R,L).

13. Optical system according to claim 2, characterized in that the mirrors mirror-coated on both sides are cut such that they are oval, so that their edge appears circular in the plan view along the optical axis (A).

14. Optical system according to claim 3, characterized in that the mirrors mirror-coated on both sides are cut such that they are oval, so that their edge appears circular in the plan view along the optical axis (A).

15. Optical system according to claim 4, characterized in that the mirrors mirror-coated on both sides are cut such that they are oval, so that their edge appears circular in the plan view along the optical axis (A).

16. Optical system according to claim 2, characterized in that the perpendiculars to the reflection surfaces of the mirrors mirror-coated on one side respectively lie in a plane parallel to the plane (E) of the optical arrangement.

17. Optical system according to claim 3, characterized in that the perpendiculars to the reflection surfaces of the mirrors mirror-coated on one side respectively lie in a plane parallel to the plane (E) of the optical arrangement.

18. Optical system according to claim 4, characterized in that the perpendiculars to the reflection surfaces of the mirrors mirror-coated on one side respectively lie in a plane parallel to the plane (E) of the optical arrangement.

19. Optical system according to claim 2, characterized in that it has precisely four mirrors reflecting on one side.

20. Optical system according to claim 3, characterized in that it has precisely four mirrors reflecting on one side.

* * * * *